(12) United States Patent
Matsukawa et al.

(10) Patent No.: US 9,449,193 B2
(45) Date of Patent: Sep. 20, 2016

(54) INFORMATION PROCESSING APPARATUS

(71) Applicant: Kabushiki Kaisha Toshiba, Minato-ku (JP)

(72) Inventors: Shinichi Matsukawa, Tokyo (JP); Yasufumi Tsumagari, Kawasaki (JP); Yuji Nagai, Sagamihara (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 14/188,976

(22) Filed: Feb. 25, 2014

(65) Prior Publication Data
US 2015/0096058 A1 Apr. 2, 2015

(30) Foreign Application Priority Data
Sep. 27, 2013 (JP) ................................. 2013-202524

(51) Int. Cl.
*G06F 21/62* (2013.01)
*G06F 21/77* (2013.01)
*G06F 12/14* (2006.01)

(52) U.S. Cl.
CPC ......... *G06F 21/629* (2013.01); *G06F 12/1408* (2013.01); *G06F 21/6218* (2013.01); *G06F 21/77* (2013.01)

(58) Field of Classification Search
CPC .. G06F 21/629; G06F 21/6218; G06F 21/77; G06F 12/14
See application file for complete search history.

(56) References Cited

U.S. PATENT DOCUMENTS 6,003,113 A * 12/1999 Hoshino .............. G06Q 20/341 235/492
6,611,907 B1 * 8/2003 Maeda et al. ................. 711/170
2002/0144117 A1 * 10/2002 Faigle ........................... 713/169
2003/0097340 A1 5/2003 Okamoto et al.
2006/0289659 A1 * 12/2006 Mizushima ........... G06F 21/606 235/492
2009/0222910 A1 * 9/2009 Le Bihan .............. G06F 21/445 726/19
2011/0314304 A1 * 12/2011 Braams ......................... 713/193
2012/0303972 A1 * 11/2012 Kuno et al. ................... 713/189
2013/0154473 A1 6/2013 Kaneko et al.

FOREIGN PATENT DOCUMENTS

JP 2003-523698 8/2003
JP 2012-52010 3/2012
(Continued)

OTHER PUBLICATIONS

Japanese Office Action issued in Patent Application No. 2013-202524, dated Jan. 5, 2016. (With English translation (9 pages).

*Primary Examiner* — Robert Leung
(74) *Attorney, Agent, or Firm* — Oblon, McClelland, Maier & Neustadt, L.L.P

(57) ABSTRACT

According to one embodiment, an information processing apparatus includes a nonvolatile semiconductor memory and a processor. The nonvolatile semiconductor memory stores identification information. The processor controls an application which executes authentication processing for authenticating validation of the identification information stored in the nonvolatile semiconductor memory. The processor executes the application to read the identification information from the nonvolatile semiconductor memory, and to execute the authentication processing for determining whether or not the identification information is authentic. When the identification information is authentic, the processor continues at least some processes of the application, and when the identification information is inauthentic, the processor ends at least some processes of the application.

9 Claims, 16 Drawing Sheets

(56) References Cited

FOREIGN PATENT DOCUMENTS

| JP | 2012-203490 | 10/2012 |
| JP | 2012-227901 | 11/2012 |
| JP | 2013-117946 | 6/2013 |
| WO | WO 01/61600 A1 | 8/2001 |

* cited by examiner

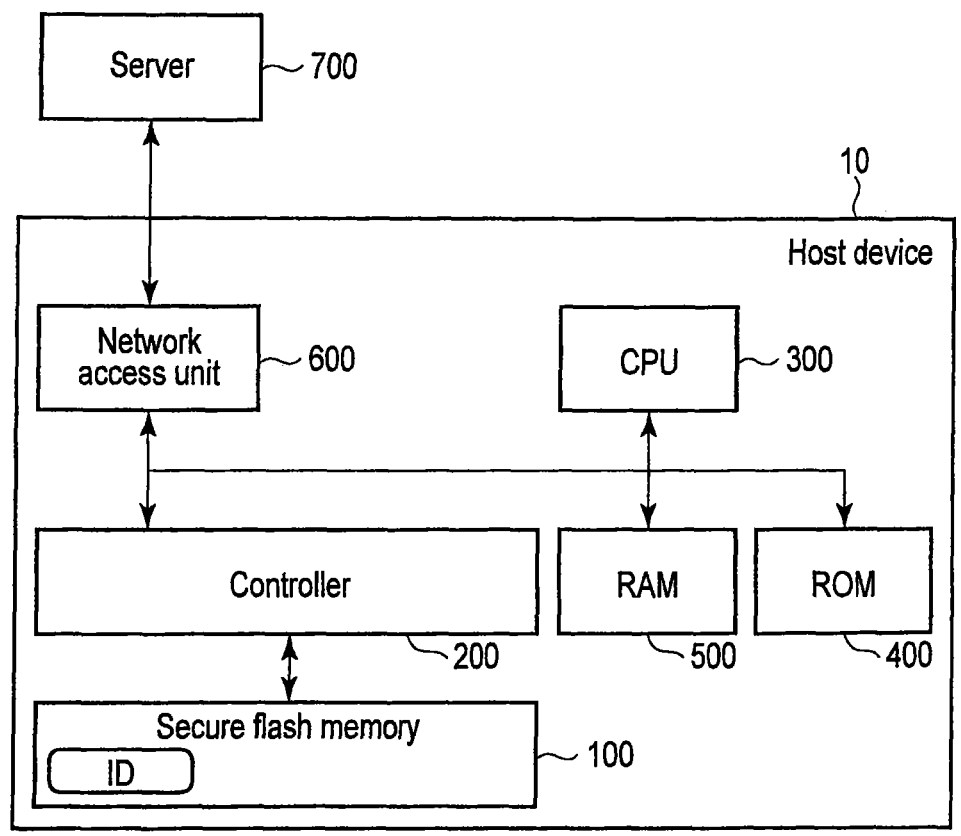
F I G. 1

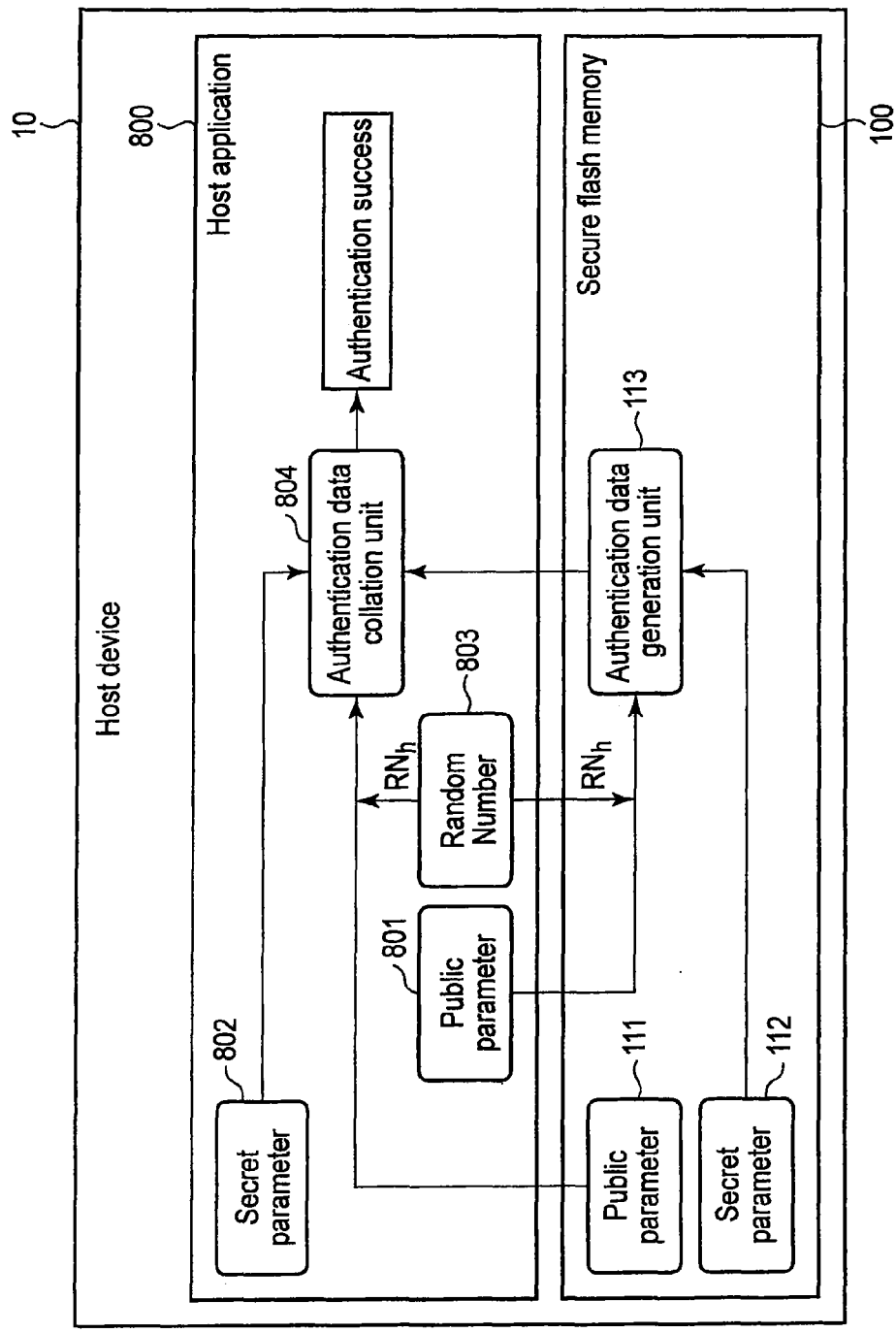
F I G. 2

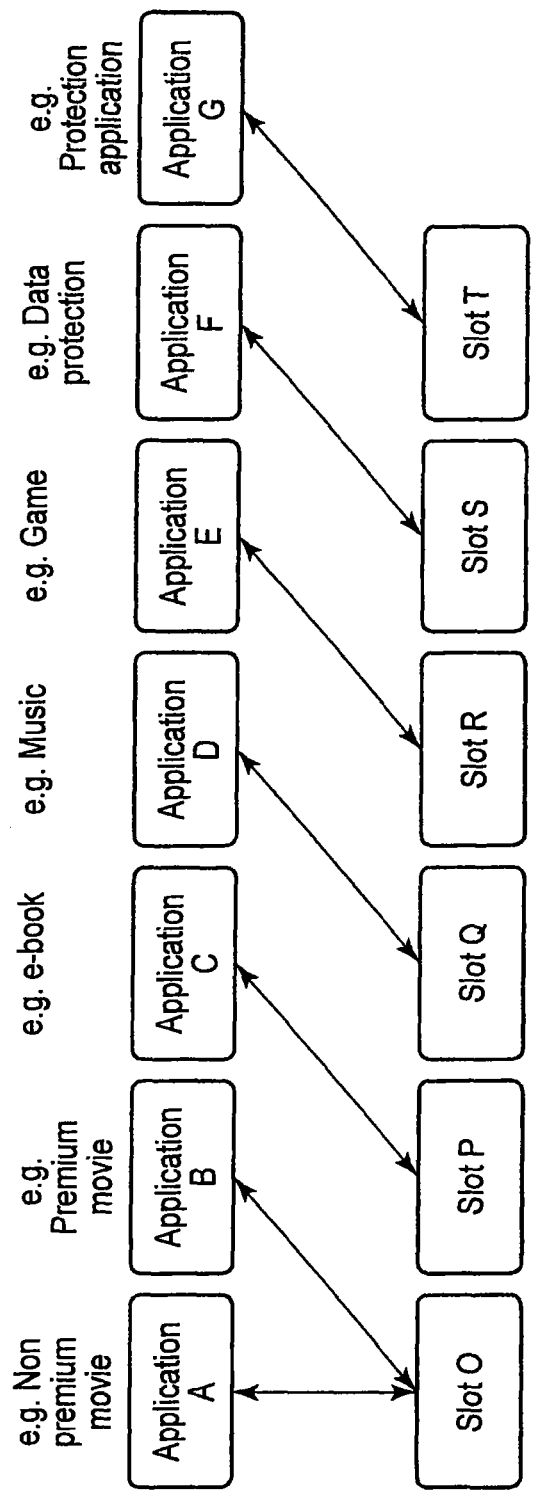
F I G. 6

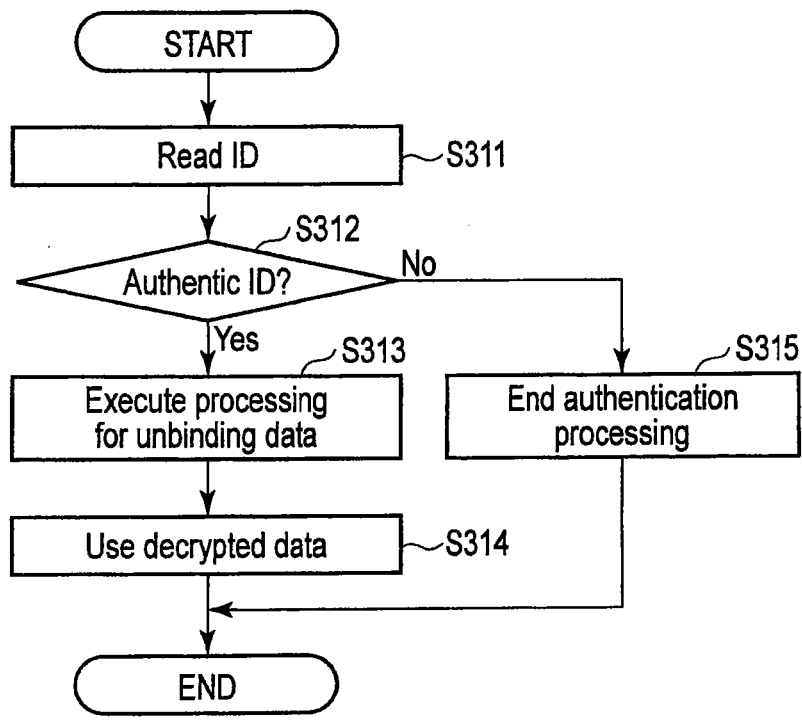
F I G. 14
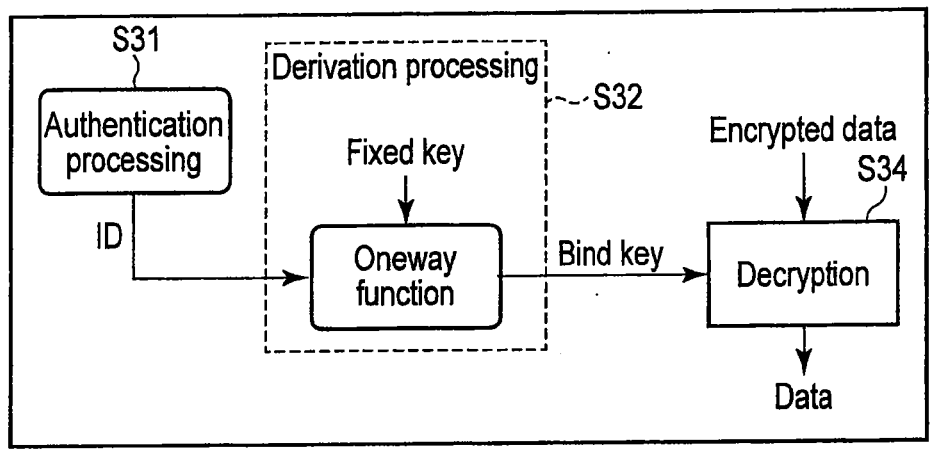
F I G. 15

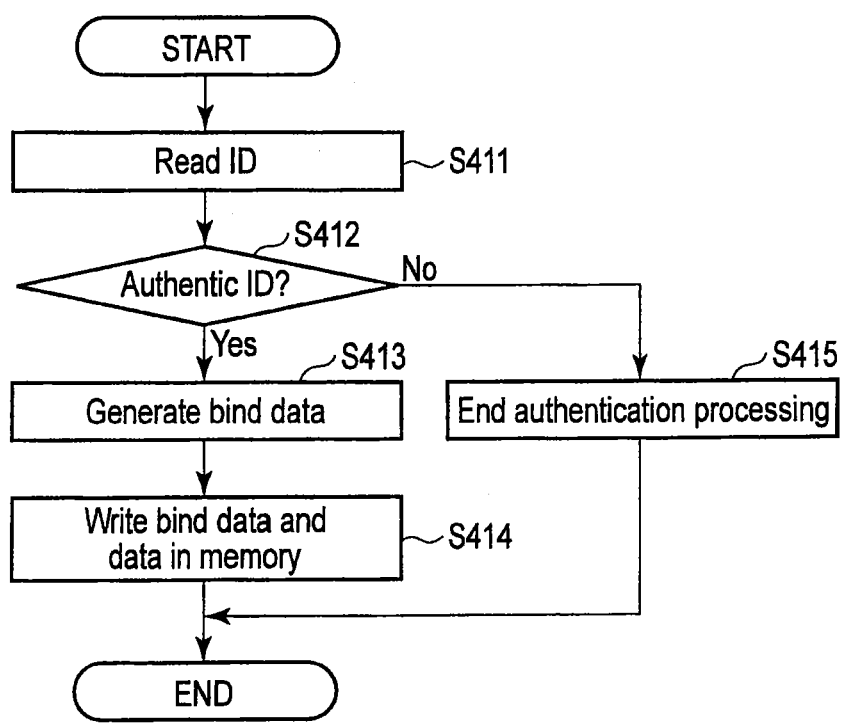
F I G. 17

INFORMATION PROCESSING APPARATUS

CROSS-REFERENCE TO RELATED APPLICATIONS

This application is based upon and claims the benefit of priority from the Japanese Patent Application No. 2013-202524, filed Sep. 27, 2013, the entire contents of which are incorporated herein by reference.

FIELD

Embodiments described herein relate generally to an information processing apparatus including a nonvolatile semiconductor memory.

BACKGROUND

In general, to guarantee information security, an authentication technique using secret information and a cipher which are common to each other as means for demonstrating self validation is adopted.

For example, an IC card (Smart Card) used in electronic payment includes an IC chip, which holds an ID (identifier) required to identify the IC card and secret information. Furthermore, the IC card has an encryption processing function of executing authentication based on the ID and secret information.

In another example, known is a content copyright protection technique using CPRM (Content Protection for Recordable Media) to demonstrate the validation of an SD card (trademark).

BRIEF DESCRIPTION OF THE DRAWINGS

FIG. 1 is a block diagram showing an overview of the hardware arrangement of a host device according to a first embodiment;

FIG. 2 is a block diagram showing the functional arrangement of the host device according to the first embodiment;

FIG. 6 is a view showing a use method of slots according to the first embodiment;

FIG. 14 is a flowchart showing authentication processing and unbind processing by a CPU according to the second embodiment;

FIG. 15 is a view showing a practical example of the unbind processing according to the second embodiment;

FIG. 17 is a flowchart showing authentication processing and bind processing by a server according to the third embodiment;

DETAILED DESCRIPTION

Figure 3:
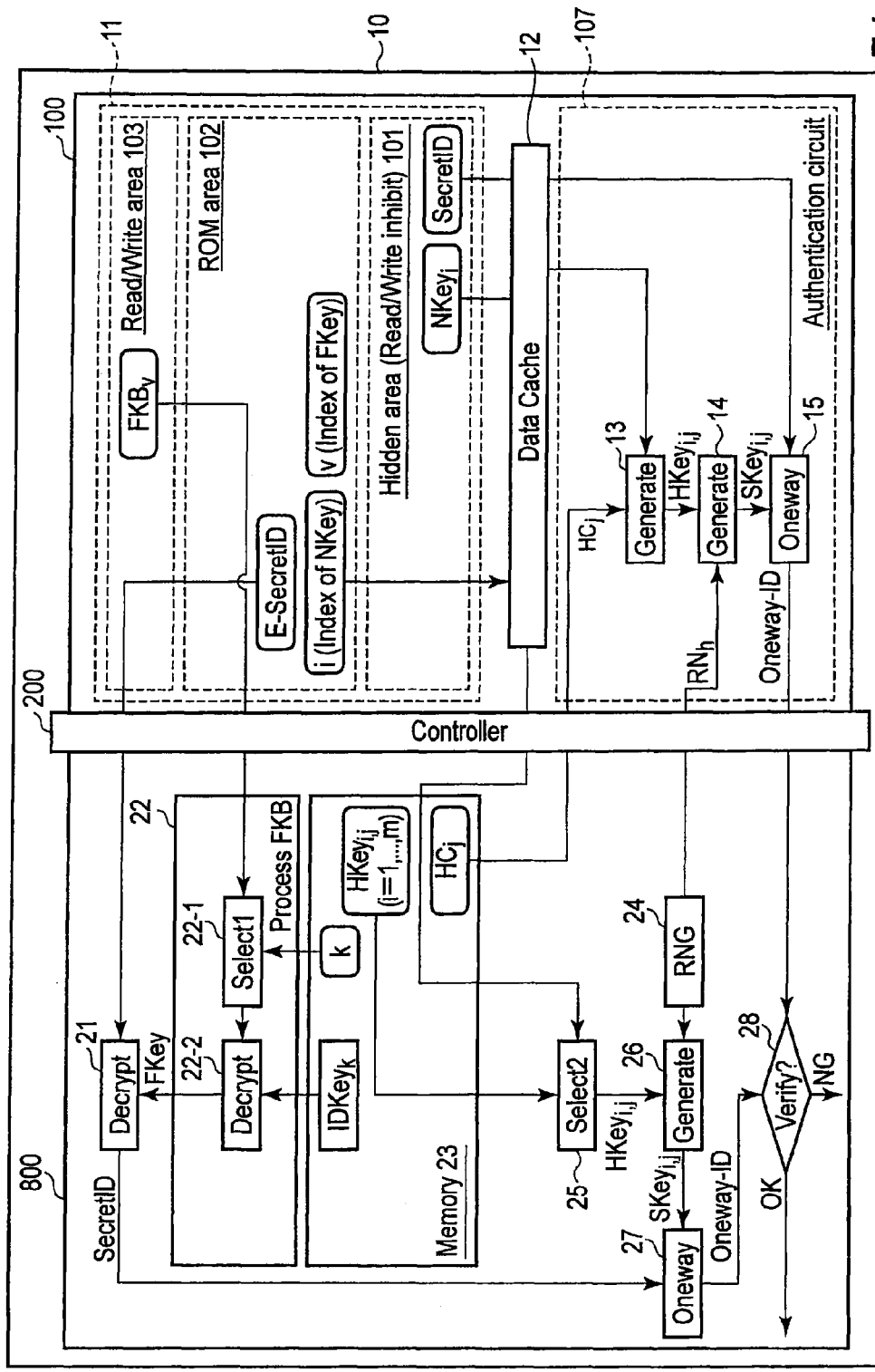
FIG. 3 is a block diagram showing a configuration example of the host device according to the first embodiment.

In general, according to one embodiment, an information processing apparatus includes a nonvolatile semiconductor memory and a processor. The nonvolatile semiconductor memory stores identification information. The processor controls an application which executes authentication processing for authenticating validation of the identification information stored in the nonvolatile semiconductor memory. The processor executes the application to read the identification information from the nonvolatile semiconductor memory, and to execute the authentication processing for determining whether or not the identification information is authentic. When the identification information is authentic, the processor continues at least some processes of the application, and when the identification information is inauthentic, the processor ends at least some processes of the application.

An information processing apparatus according to one embodiment will be described hereinafter with reference to the drawings. The information processing apparatus includes a host device such as a computer, smartphone, tablet terminal, or PDA (Personal Digital Assistant). In this specification, the information processing apparatus will be referred to as a host device. The same reference numerals denote components having substantially the same functions and arrangements, and a repetitive description thereof will be given if necessary. Also, embodiments to be described hereinafter will exemplify an apparatus and method required to embody the technical idea of these embodiments, and do not specify materials, shapes, structures, layouts, and the like to those described below. The technical idea of the embodiment can be variously changed within the scope of the claims.

First Embodiment

FIG. 1 is a block diagram showing an overview of the hardware arrangement of a host device according to the first embodiment.

As shown in FIG. 1, a host device 10 includes a secure flash memory 100, controller 200, CPU (Central Processing Unit) 300, ROM (Read Only Memory) 400, RAM (Random Access Memory) 500, and network access unit 600.

The secure flash memory 100 includes, for example, a nonvolatile semiconductor memory such as a NAND flash memory having identification information. The controller 200 controls the operation of the secure flash memory 100.

The CPU 300 controls the overall operations in the host device 10. The ROM 400 stores firmware such as control programs used by the CPU 300. The RAM 500 is used as a work area of the CPU 300, and temporarily stores control programs, various tables, data, and the like. The network access unit 600 connects a network (for example, including a server 700) and the host device 10 upon exchanging data on the network.

An overview of the functional arrangement of the host device according to the first embodiment will be described below.

FIG. 2 is a block diagram showing the functional arrangement of the host device.

As shown in FIG. 2, the host device 10 includes the secure flash memory 100 and a host application 800. The secure flash memory 100 includes a public parameter 111, secret parameter 112, and authentication data generation unit 113. The host application 800 is executed by the CPU 300, and uses various resources in the host device 10 such as the ROM 400 and RAM 500. The host application 800 includes a public parameter 801, secret parameter 802, random number generation unit 803, and authentication data collation unit 804.

Authentication processing of the host device 10 is executed as follows.

The CPU 300 which executes the host application 800 outputs a random number RNh generated by the public parameter 801 and random number generation unit 803 to the secure flash memory 100. The secure flash memory 100 generates, using the authentication data generation unit 113, authentication data based on the public parameter 801 and random number RNh acquired from the host application 800, and the secret parameter 112 included in itself.

The secure flash memory 100 outputs the public parameter 111 to the CPU 300 which executes the host application 800. The CPU 300 generates, using the authentication data collation unit 804, authentication data based on the public parameter 111 acquired from the secure flash memory 100, the random number RNh generated by the random number generation unit 803, and the secret parameter 802 included in itself.

The CPU 300 collates the authentication data generated by the host application itself and that generated by the secure flash memory 100 using the authentication data collation unit 804. If the two pieces of authentication data match, the authentication succeeds, and the CPU 300 can execute the following processing by the host application 800. On the other hand, when the two pieces of authentication data do not match, the authentication fails, and the CPU 300 stops the authentication processing by the host application 800, thus quitting the host application 800.

The host application may be, for example, an operating system which runs on the host device. Alternatively, the host application may be various application programs which run on the operating system. The following mode is also possible. When the authentication has failed, in place of quitting all the operations of the host application 800, only at least some functions or processes may be inhibited from being executed, and when the authentication has succeeded, only at least some functions or processes may be permitted to be executed. The host application 800 may execute the authentication processing when it is launched or when specific processing is executed after it is launched.

An authentication unit, authenticated unit, and authentication method in the host device according to the first embodiment will be described below.

1. Configuration Example

Host Device

A configuration example of the host device according to the first embodiment will be described below with reference to FIG. 3. FIG. 3 shows a state after secret information NKey and secret identification information SecretID are given from a memory manufacturer to the secure flash memory 100. This embodiment shows a case in which the secure flash memory 100 is, for example, a NAND flash memory.

In this case, the secret information NKey and secret identification information SecretID correspond to the identification information included in the secure flash memory 100, and may have arbitrary identities. For example, the secret information NKey may assume a value unique to each secure flash memory 100, or may assume a value unique to each lot of the memory 100 or a value unique to each manufacturer of the memory 100. In addition, the secret identification information SecretID may assume a value unique to each secure flash memory 100, or may assume a value unique to each lot of the memory 100 or a value unique to each manufacturer of the memory 100. The granularity of the identity may be selected as needed, and at least one of the secret information NKey and secret identification information SecretID desirably assumes a value unique to each secure flash memory 100.

As shown in FIG. 3, the host device 10 according to the first embodiment includes the security flash memory 100 as an authenticated unit, the host application 800 as an authentication unit, and the controller 200 which intervenes between the two units. The host application 800 is executed by the CPU 300. The CPU 300 accesses the secure flash memory 100 according to processing executed by the host application 800.

Manufacturing processes of a semiconductor product such as the secure flash memory 100 will be briefly explained below. The manufacturing processes of a semiconductor product can be mainly classified into a pre-process for forming a circuit onto a substrate wafer, and a post-process for dividing the wafer into pieces, and executing wiring, resin packaging, and the like.

There are various cases such as a case in which the controller 200 is configured to be included in the secure flash memory 100 in the pre-process, a case in which the controller 200 is not included in the pre-process but is configured to be included in the single package in the post-process, a case in which the controller 200 is provided as a chip different from the secure flash memory 100, and so forth. The following description will be given taking an example in which the controller 200 is provided as a chip different from the secure flash memory 100 as well as in FIG. 3.

In the following description, data and instructions are exchanged between the host application 800 and secure flash memory 100 via the controller 200 in many cases, unless otherwise specified. Since the controller 200 never changes essential contents of the data and instructions even in such case, a detailed description thereof often will not be given. Note that details of configuration examples of the secure flash memory 100 and host application 800 will be described later.

Respective components and data processing shown in FIG. 3 will be described below. This embodiment will explain a method of reading out the secret identification information SecretID recorded in the authenticated unit in a state hidden from a third party, and confirming data read out from the authentic authenticated unit, and the configuration example used when this method is applied to the host device using the secure flash memory 100.

1-1. Secure Flash Memory

In this embodiment, the secure flash memory 100 is, for example, a NAND flash memory, and an authenticated unit, the self validation of which is authenticated.

As shown in FIG. 3, the secure flash memory 100 according to this embodiment includes a memory cell array 11, a data cache 12 arranged in a surrounding region of the memory cell array, data generation circuits or units (Generate) 13 and 14, and a oneway converter (Oneway) 15. The data generation circuits 13 and 14 and oneway converter 15 configure an authentication circuit 107.

The memory cell array 11 includes a hidden area 101 to which both external read and write accesses are inhibited, a ROM area 102 to which external write accesses are inhibited, and a read/write area 103 to which both external read and write accesses are permitted.

The read/write area (general area) 103 is an area to which both data write and read accesses from the outside of the secure flash memory 100 are permitted. The read/write area 103 records key management information FKBv (Family Key Block) as an encryption FKey bundle prepared to hide hidden information FKeyv. The key management information FKBv is configured to be recorded not only at the time of manufacture of the secure flash memory 100 but also at the time of manufacture of a storage medium such as an SD card for a general user by combining a controller with the secure flash memory 100, or it is configured to be downloaded from a server according to a user's request and to be recorded after the storage media is sold, unlike other data recorded in the secure flash memory 100. Details will be described later.

In this case, the key management information FKBv is information used to decrypt the hidden information FKeyv based on the secret information IDKeyk held by the host application 800 and index information k of the secret information IDKeyk, or is information used to decrypt the hidden information FKeyv based on the secret information IDKeyk held by the host application 800 and identification information of the host application 800.

Also, the key management information FKBv is information, which is not only uniquely prepared for each secure flash memory 100, but which can be commonly assigned to (information which can be associated with) a plurality of secure flash memories 100 such as a manufacturing lot unit or wafer unit of secure flash memories 100 in correspondence with the manufacturing processes. The index information v of the key management information FKBv may be identification information or version number information of the key management information FKBv.

The hidden area 101 is an area to which data read and write accesses from the outside of the secure flash memory 100 are inhibited (Read/Write inhibit). The hidden area 101 records secret information NKeyi used by the secure flash memory 100 in authentication processing and secret identification information SecretID of the secure flash memory 100.

The ROM area 102 is an area to which data write accesses from the outside of the secure flash memory 100 are inhibited, and data read accesses are permitted. The ROM area 102 records index information v (index of FKey) required to indicate the hidden information FKeyv hidden by the key management information FKBv, secret identification information Secret ID (E-SecretID) encrypted by the hidden information FKeyv, and index information i (index of NKey) required to indicate the secret information NKeyi.

In this embodiment, the index information i and index information v are generally recorded while being appended with error correction codes, so as to read out correct identification information even when an error has occurred in data when these pieces of information are recorded. However, error correction encoding and decoding processes will not be particularly illustrated for the sake of simplicity.

Note that the ROM area 102 may be, for example, an OTP (One Time Program) area to which only one write access is permitted, or a general area to which read and write accesses are permitted in the manufacturing processes of the secure flash memory 100 and which is changed to a read only area by rewriting a management flag after shipment. Alternatively, a method of using a special command different from a write command for a general area, and not providing this special command to a recipient of the secure flash memory 100 may be used. As another configuration, the ROM area 102 may be handled as a general area on the secure flash memory 100, and a function provided by the controller 200 to the host application 800 may be limited to a read only function.

Note that since information recorded in the ROM area 102 is associated with that recorded in the hidden area 101, as will be described later, when information recorded in the ROM area 102 is tampered with, the authentication function of the secure flash memory 100 cannot effectively operate. Therefore, since there is no concern in terms of security due to tampering, the ROM area need not always be used, and a general area which allows read and write accesses may be used instead. In this case, the ROM area 102 in FIG. 3 can be read as the read/write area (general area) 103. In this connection, some data described in the ROM area 102 may be recorded in the read/write area (general area) 103. For example, in another configuration, the index information v (index of FKey) can be recorded in the read/write area (general area), and the encrypted secret identification information (E-SecretID) and index information v (index of FKey) can be recorded in the ROM area 102. The configuration example of the ROM area 102 is applicable to the ROM area 102 to be described later as other embodiments and modifications in this specification.

The encrypted secret identification information E-SecretID is data obtained by encrypting the secret identification information SecretID uniquely assigned to each chip of the secure flash memory 100 using the hidden information FKeyv. Alternatively, when the same content data is to be recorded for the purpose of prerecorded content distribution (upon sales of secure flash memories which record content in advance), the same encrypted secret identification information E-SecretID is recorded on purpose. Hence, the same encrypted secret identification information can be recorded in a plurality of secure flash memories according to the usage.

The data cache 12 temporarily stores data read out from the memory (cell array) 11.

The data generation units 13 and 14 are circuits for generating output data from a plurality of input data by predetermined calculations.

The data generation unit 13 generates secret information HKeyi,j by converting a constant HCj received from the host application 800 using the aforementioned secret information NKeyi. The data generation unit 14 generates a session key SKeyi,j by converting a random number RNh received from the host application 800 using the secret information HKeyi,j. The data generation units 13 and 14 can be implemented by hardware (circuit), software, or a combination of both hardware and software.

When the data generation units 13 and 14 are implemented as circuits, the same circuit as the oneway converter 15 (to be described later), a circuit which diverts the oneway converter, an AES (Advanced Encryption Standard) encryption unit, or the like can be used so as to reduce the overall circuit scale. Likewise, the two data generation units illustrated as different components to allow easy understanding of the data processing sequence can repetitively use the same circuit. In this example, a configuration of $HKey_{i,j} = AES\_E(NKey_i, HC_j)$, $SKey_{i,j} = AES\_E(HKey_{i,j}, RN_h)$, and the like can be adopted.

The oneway converter 15 applies oneway conversion to input data and separately input key data, and outputs oneway-converted input data. The oneway converter 15 can be implemented by hardware (circuit), software, or a combination of both hardware and software.

The oneway converter 15 generates oneway-converted identification information Oneway-ID (=Oneway($SKey_{i,j}$, SecretID)) by converting, using a oneway function, the secret identification information SecretID read out from the hidden area 101 using the session key $SKey_{i,j}$ generated by the data generation circuit 14. Also, when the oneway converter 15 is implemented as a circuit, the data generation unit 14 or the like can be diverted so as to reduce the overall circuit scale, as described above. In this example, a configuration of Oneway-ID=AES_E($SKey_{i,j}$, SecretID) (+) SecretID, or the like can be adopted.

1-2. Host Application

In this embodiment, the host application 800 is an authentication unit which determines the validation of the authenticated unit.

As shown in FIG. 3, the host application 800 includes functional blocks such as a decryption unit (Decrypt) 21, FKB processor (Process FKB) 22, memory unit (RAM 500 and ROM 400) 23, random number generator (RNG) 24, selector (Select2) 25, data generator (Generate) 26, oneway converter (Oneway) 27, and data verification unit (Verify) 28. In addition, for example, an error correction processor (not shown) or the like can be added as a component as needed.

The decryption unit 21 decrypts input data using separately input key data, and outputs decrypted input data. In this embodiment, the decryption unit 21 reads out the encrypted secret identification information E-SecretID from the secure flash memory 100 via the controller 200. Then, the decryption unit 21 decrypts the encrypted secret identification information E-SecretID using hidden information FKey input from the FKB processor 22 (data selector 22-2; to be described below), and outputs secret identification information SecretID.

The FKB processor 22 decrypts the key management information FKBv, read out from the secure flash memory 100, using secret information IDKeyk hidden in the memory unit 23 and index information k of the secret information IDKeyk, and outputs generated hidden information FKey to the decryption unit 21. In this embodiment, the FKB processor 22 includes a data selector (Select1) 21-1 and decryption unit (Decrypt) 22-2.

Using the index information k recorded in the memory unit 23, the data selector 21-1 of the first stage selects data which can be decrypted by the secret information IDKeyk hidden in the memory unit 23 from the encryption FKey bundle (key management information FKBv) read out from the secure flash memory 100, and outputs the selected data to the decryption unit 22-2.

The decryption unit 22-2 decrypts the data selected by the data selector 22-1, using the secret information IDKeyk hidden in the memory unit 23, and outputs generated hidden information FKey to the decryption unit 21.

Note that the example of the host application 800, which includes the FKB processor 22 and outputs the hidden information FKey generated in the FKB processor 22 to the decryption unit 21 has been described. Alternatively, the memory unit 23 may store the hidden information FKey in advance, and may output this hidden information FKey to the decryption unit 21.

The memory unit 23 records the index information k, the secret information IDKeyk, a secret information set $HKey_{i,j}$ (i=1, . . . , m; note that j is a fixed value in the information $HKey_{i,j}$), and the constant $HC_j$, and hides at least the secret information IDKeyk and secret information set $HKey_{i,j}$ (i=1, . . . , m) from the outside of the host application 800. Note that the constant $HC_j$ is a constant of the host application 800, which is held in advance to be output to the secure flash memory 100 upon reception of an authentication request (Request authentication). Details will be described later.

The random number generator 24 generates and outputs the random number $RN_h$ used in authentication processing.

Using index information i, which is read out from the ROM area 102 of the secure flash memory 100 via the data cache 12, the data selector 25 of the second stage selects secret information $HKey_{i,j}$ required for authentication processing from the secret information set $HKey_{i,j}$ hidden by the host application 800.

The data generator 26 is a calculation unit which generates output data from a plurality of input data by predetermined calculations. In this embodiment, the data generator 26 generates a session key $SKey_{i,j}$ by converting the random number $RN_h$, generated by the host application 800 itself, using the secret information $HKey_{i,j}$ hidden by the host application 800. As the data generator 26, for example, the aforementioned AES encryption unit can also be used.

The oneway converter 27 generates oneway-converted identification information Oneway-ID by converting, using a oneway function, the secret identification information SecretID output from the decryption unit 21 using the session key $SKey_{i,j}$ output from the data generator 26.

The data verification unit 28 compares whether or not the oneway-converted identification information Oneway-ID received from the secure flash memory 100 matches the oneway-converted identification information Oneway-ID obtained by the oneway converter 27 in the host application 800. When values of the two pieces of oneway-converted identification information Oneway-ID match (OK), the data verification unit 28 determines that the secret identification information SecretID obtained by the decryption unit 21 is an authentic ID, and passes the obtained secret identification information SecretID to the subsequent processing. On the other hand, when the two values do not match (NG), the data verification unit 28 determines that the secret identification information SecretID is an illicit ID, and outputs information indicating this.

In addition, when secret information (for example, IDKeyk, $HKey_{i,j}$) included in the host application 800 has leaked, and an illicit host device having the leaked information is manufactured by an illicit manufacturer, a measure for excluding information which can derive FKey, using IDKeyk possessed by the illicit host device from the key management information (FKBv) can be taken as a means for invalidating the illicit host device. Upon taking this measure, it is effective to associate the secret information IDKeyk and index information k, the secret information $HKey_{i,j}$, and the host constant $HC_j$ with each other. If these pieces of information are associated with each other, both pieces of secret information IDKeyk and HKeyi,j possessed by the illicit host device can be specified by observing HCj notified by the illicit host device in authentication. As the association method, a method of sharing all or some pieces of information of HCj with IDKeyk, a method of configuring all or some pieces of information of HCj by encryption processing results of IDKeyk, a method of configuring all or some pieces of information of IDKeyk by encryption results of HCj, and the like can be used. Furthermore, it is desirable to use HKeyi,j in addition to FKey and IDKeyk upon generation of the key management information (FKBv).

Note that the secret information IDKeyk and secret information HKeyi,j are recorded in, for example, a dedicated memory in the host device after they are encrypted by a method unique to a manufacturer. These pieces of information are held in a state protected from illicit analysis by a tamper-resistant software (TRS) technique in the case of a program executed by a PC or the like, or these pieces of information are recorded in a hidden state as a measure for hiding them using a security module function if the security module is incorporated.

Note that the controller (Controller) 200 controls the secure flash memory 100 to execute data transfer and the like with the CPU which executes the host application 800. For example, the controller 200 interprets an instruction received from the CPU 300 which executes the host application 800, converts it into an instruction compliant with an interface specification of the secure flash memory 100, and then outputs the instruction to the secure flash memory 100. The controller 200 can adopt, for example, various interface standards such as an SD Memory standard, SDIO standard, and eMMC standard as needed.

Also, the controller 200 allocates a part of the general area 103, and saves control data required for its own operations. The controller 200 may have a function of converting a logical address received from the CPU 300 which executes the host application 800 into a physical address of the secure flash memory 100. Furthermore, the controller 200 may have a function of executing so-called wear leveling so as to level a wear of the memory 100. However, at least the hidden area 101 is excluded from a wear leveling target.

The configuration example of the host device is not limited to the aforementioned example. For example, the host device may include other components such as an error correction processor (not shown) as needed. Furthermore, a plurality of pieces of secret information NKeyi may be recorded in the secure flash memory 100. That is, a combination of secret information NKeyi and corresponding index information i is defined as one slot, and a plurality of slots are recorded in the secure flash memory 100. Slot numbers are given to the slots, and the CPU which executes the host application 800 reads out index information i of each slot number and selects one secret information to execute authentication.

In this case, the CPU 300 which executes the host application 800 notifies the secure flash memory 100 of information corresponding to the selected slot number, and the secure flash memory 100 executes authentication processing using information corresponding to the notified slot number. Furthermore, all pieces of information recorded in the secure flash memory 100 may be defined as one slot, and a plurality of information slots may be recorded. That is, the secret information NKeyi, index information i, key management information (FKBv), index information v (index of FKey), secret identification information SecretID, and encrypted secret identification information E-SecretID define one slot, and a plurality of slots are recorded in the secure flash memory 100.

The method of recording the plurality of slots in the secure flash memory 100 has been described. However, the present invention is not limited to this, and a configuration which shares some pieces of information among a plurality of slots can be adopted. For example, the secret identification information SecretID, encrypted secret identification information E-SecretID, key management information (FKBv), and index information v (index of FKey) can be shared by a plurality of slots, and the remaining pieces of information can be prepared for each slot.

Also, the method in which the secure flash memory 100 includes a plurality of slots and slot numbers, and the CPU 300 which executes the host application 800 notifies the secure flash memory 100 of a slot to be used in authentication is applicable to all other embodiments to be described later in this specification.

2. Authentication Sequence

Figure 4:
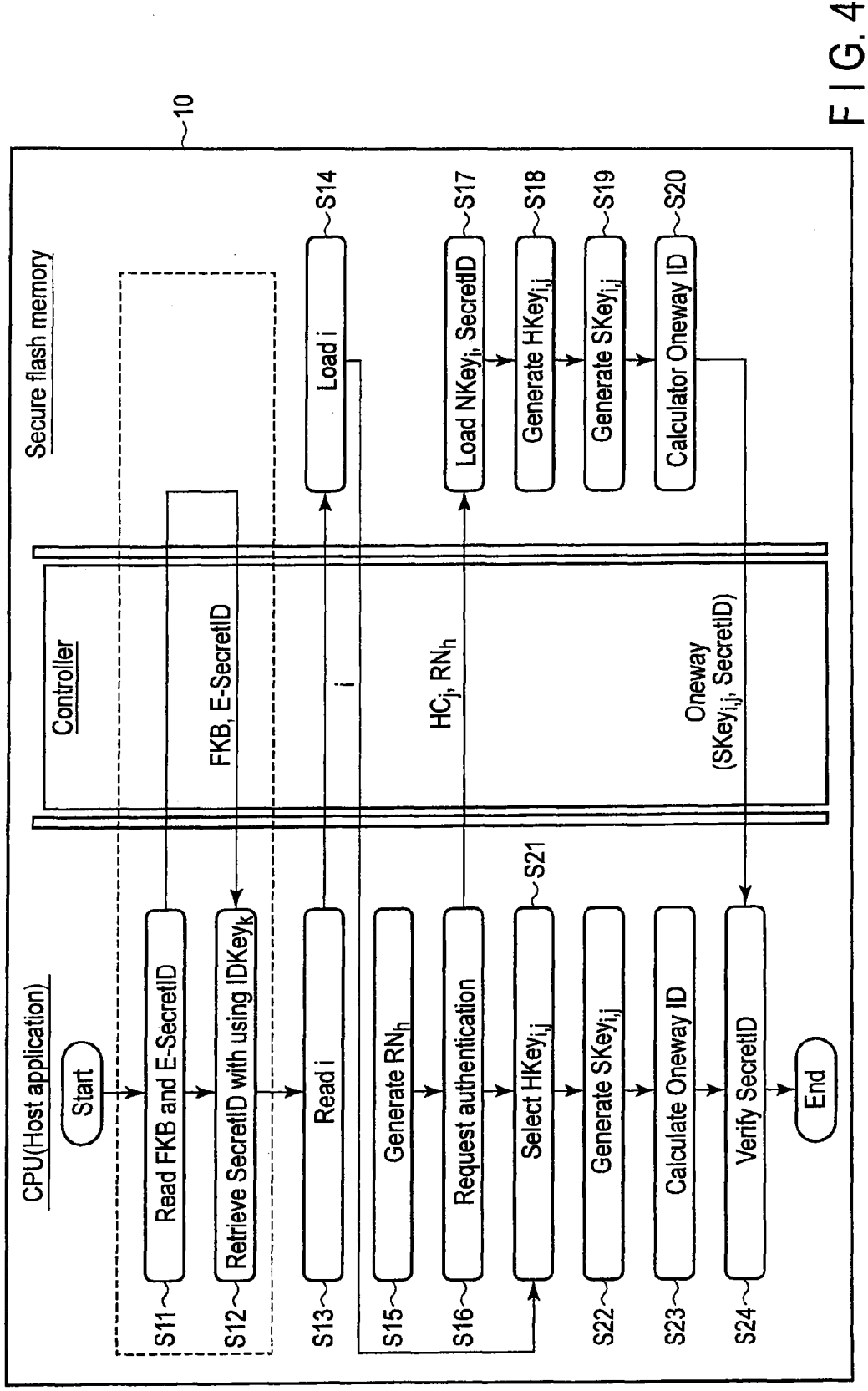
FIG. 4 is a flowchart showing the authentication sequence of a secure flash memory in the host device according to the first embodiment.

The authentication sequence of the secure flash memory in the host device according to the first embodiment will be described below with reference to FIG. 4. The host application 800 is executed by the CPU 300.

(Step S11)

When authentication is started, the CPU 300, which executes the host application 800, reads out an encryption FKey bundle (FKB: Family Key Block) as key management information and encrypted secret identification information E-SecretID from the secure flash memory 100.

(Step S12)

Subsequently, the CPU 300 controls the data selector (Select1) 22-1 to execute data selection processing from the readout key management information FKB so as to read out encrypted hidden information FKey which can be decrypted by the CPU 300, and controls the decryption unit 22-2 to decrypt the encrypted hidden information FKey using hidden secret information IDKeyk, thus obtaining hidden information FKey. Furthermore, the CPU 300 decrypts the encrypted secret identification information E-SecretID read out from the secure flash memory 100 using the obtained hidden information FKey, thus obtaining secret identification information SecretID.

Note that the key management information FKB is read out in step S11, and the hidden information FKey is calculated in step S12. Alternatively, the hidden information FKey, which is calculated in advance, can be provided to the host application 800, and the need for processing for calculating the hidden information FKey from the key management information FKB can be obviated.

(Step S13)

The CPU 300 issues a read request to the secure flash memory 100 to read index information i.

(Step S14)

In response to the request from the CPU 300, the secure flash memory 100 loads the index information i from the secure flash memory 100, and outputs the readout information to the CPU 300.

(Step S15)

The CPU 300 then generates a random number RNh required at the time of an authentication request. Using the random number RNh in authentication processing, the following processes can use a different shared key with the secure flash memory 100 each time.

(Step S16)

The CPU 300 outputs a constant HCj, which is held in advance, and the random number RNh to the secure flash memory 100 together with an authentication request (Request authentication).

(Step S17)

The secure flash memory 100 loads secret information NKeyi (i=1, ... , m) and secret identification information SecretID from the hidden area 101, and saves these pieces of information in the data cache 12.

(step S18)

The secure flash memory 100 generates secret information HKeyi,j by data generation processing of the data generation circuit 13 using hidden secret information NKeyi and the constant HCj received from the CPU 300.

(Step S19)

The secure flash memory 100 then generates a session key SKeyi,j (=Generate(HKeyi,j, RNh) by data generation processing of the data generation circuit 14 using the received random number RNh.

(Step S20)

Then, the secure flash memory 100 generates oneway-converted identification information Oneway-ID (=Oneway (SKeyi,j, Secret ID) by applying oneway conversion processing of the oneway converter 15 to the secret identification information SecretID using the generated session key SKeyi,j. The generated oneway-converted identification information Oneway-ID is output to the CPU 300.

(Step S21)

Parallel to step S18, the CPU 300 selects secret information HKeyi,j required for authentication processing with the secure flash memory 100 from the secret information set HKeyi,j (i=1, ... , m), which is hidden in advance, using the received index information i.

(Step S22)

The CPU 300 generates a session key SKeyi,j (=Generate (HKeyi,j, RNh) by data generation processing of the data generator 26 using the selected secret information HKeyi,j and the generated random number RNh.

(Step S23)

The CPU 300 generates oneway-converted data Oneway-ID by applying oneway conversion processing of the oneway converter 27 to the secret identification information SecretID using the generated session key SKeyi,j.

(Step S24)

The CPU 300 determines whether or not the oneway-converted identification information Oneway-ID received from the secure flash memory 100 matches the oneway-converted identification information Oneway-ID generated by itself.

If both values of these pieces of oneway-converted identification information Oneway-ID match (OK), the CPU 300 determines that the secret identification information SecretID obtained by the decryption unit 21 is an authentic ID, and passes the secret identification information SecretID to the subsequent processes. On the other hand, if the values do not match (NG), the CPU 300 determines that the secret identification information SecretID is an illicit ID, and outputs information indicating this to the subsequent processes.

With the above operations, the authentication sequence according to the first embodiment ends (End).

Note that as shown in the configuration example of the host device, when the secure flash memory 100 has a plurality of slots, the CPU 300 has to notify the secure flash memory 100 of a slot number used in authentication. In this case, the CPU 300 may notify the secure flash memory 100 of a slot number together in step S16 or before step S16.

A configuration example of the host application 800 and secure flash memory 100 according to the first embodiment will be described below with reference to FIG. 5. The host application 800 and memory 100 have information required for authentication corresponding to each use mode in a set called "slot".

Each slot is defined as an aggregate of information and functions necessary for authentication required in each use mode. For example, in the system shown in FIG. 5, a slot X is an aggregate of information and functions required for a certain use mode, a slot Y is that for another use mode, and a slot Z is that for still another use mode. In FIG. 5, for the sake of descriptive convenience, a function aggregate including authentication functions required for the host application 800 in respective slots is described as a host authentication unit or circuit 2001. Also, in FIG. 5, for the sake of descriptive convenience, a function aggregate including authentication function required for the secure flash memory 100 in respective slots is described as a memory authentication circuit 107'.

In this case, in authentication between the host application 800 and memory 100, the CPU which executes the host application 800 designates a slot number assigned to a slot. That is, the slot number means selection of each authentication function and data used in authentication, and means function selection depending on a required authentication level in the broad sense. The secure flash memory 100 selects data required for authentication to be used using a slot selector 301 according to the designated slot number, and executes processing corresponding to a function required for the authentication. Using the slot selector 301, the CPU selects data required for authentication to be used according to the slot number designated by itself, and executes processing corresponding to a function required for the authentication.

By introducing the concept as slots, applications having different required authentication levels can select suitable use modes, and communications are made between the host application 800 and memory 100 using them as common slot numbers, so as to easily operate various combinations of host applications 800 and the memory 100 without causing any compatibility problem and authentication mismatch.

Figure 5:
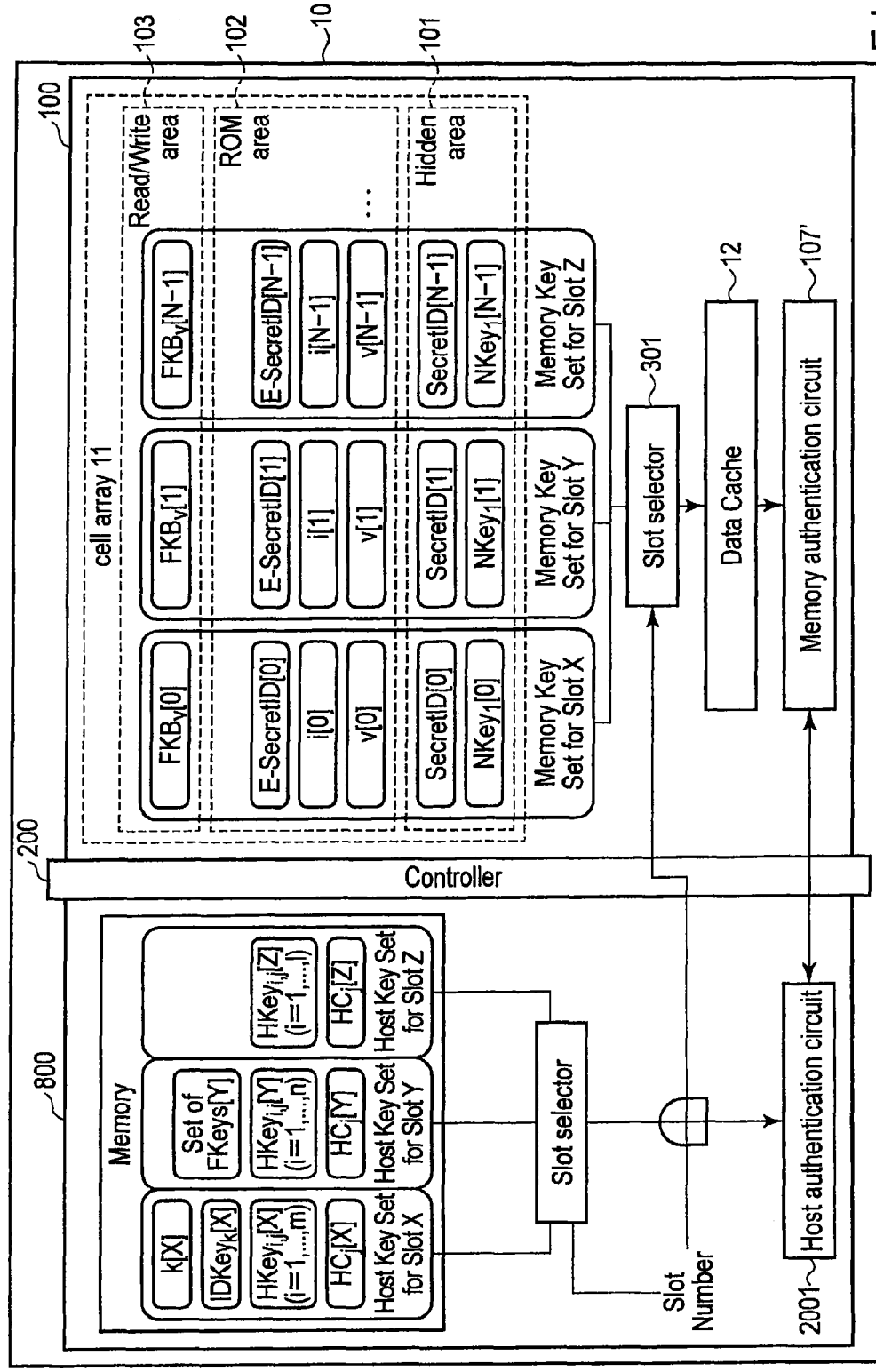
FIG. 5 is a block diagram showing a configuration example of a host application and secure flash memory according to the first embodiment.

That is, FIG. 5 shows the example in which the host application 800 supports slots X, Y, and Z, and the secure flash memory 100 supports slots X, Y, and Z, and other slots. However, the present invention is not limited to this. For example, this configuration is extendable to a case in which the host application 800 supports slot X alone, two slots X and Y, or slots X, Y, and Z and other slots and similarly to a case in which the memory 100 supports slot X alone, slot Y alone, slot Z alone, two slots X and Y, or slots X, Y, and Z. Furthermore, when there are a plurality of types of host applications 800, for example, the configuration is extendable to a case in which a host application 800A supports slot X alone and a host application 800B supports slots X and Y, and similarly to a case in which the secure flash memory 100 supports slot X alone or slot Y alone. That is, the present invention is not limited to the specific example, and can extend operations to various forms.

A slot use method will be described below with reference to FIG. 6. As described above, using a plurality of slots, one system can support a plurality of applications having different authentication levels. FIG. 6 shows an example in which slots support a plurality of applications. Slots O to T have corresponding relationships with applications A to G.

For example, in authentication processing in application A, slot O is used. Also, in authentication processing in application C, slot P is used. Note that slot O also has a corresponding relationship with application B in addition to application A.

In general, applications are classified and used according to various criteria. FIG. 6 shows a case in which applications are classified based on their content types and are assigned with slots. For example, in FIG. 6, applications are classified according to objects (book, music, game, etc.) of content data, and different slots are assigned.

On the other hand, an identical slot can be assigned to different applications for an arbitrary reason. For example, in FIG. 6, when application A handles SD (Standard Definition) non-premium movie data, and application B handles HD (High Definition) premium movie data, identical slot O can be assigned to these applications. Since both applications A and B have in common that they handle movie content data, an identical slot can be assigned to share an identical authentication function.

However, such applications may often require different authentication functions. For example, in the case of SD movie content and HD movie content, the HD movie content requires a higher security level, and may need more functions. In this case, different slots can be assigned to the HD movie content and SD movie content. Likewise, in applications C to E, an e-book, music, game, and the like can be assigned.

In addition, an application assignment method may be decided based on data protection modes and usages. For example, when there are an application intended to protect hidden information in a company and an application intended to protect personal information, different slots can be assigned to these applications.

Also, a plurality of applications which belong to a single category can be classified according to data use modes, and different slots can be assigned to these applications. For example, when there are a plurality of applications related to medical data protection, they can be classified according to differences in use place (site) (for example, hospitals, medical fronts, and the like), and different slots can be assigned to these applications. Applications which require management can be classified as proprietary applications, and different slots can be assigned to these applications.

Also, a plurality of applications may share a single slot, but operate so that data and functions required for authentication may be different. In the above description, each slot includes data and functions required for authentication. That is, this means that even when there are various host applications 800 and various secure flash memories 100 in the market, they can be operated without any confusion. Conversely, various host applications 800 and various secure flash memories 100 need not be assumed at all, like in an operation mode within a very limited range (for example, respective hospitals or medical fronts). In this case, slots are assigned based on medical classifications. However, even a single slot number may have a plurality of variations of data and functions required for authentication. Correspondence relationships between applications and slots need only be decided with reference to operational criteria of respective sites.

Figure 7:
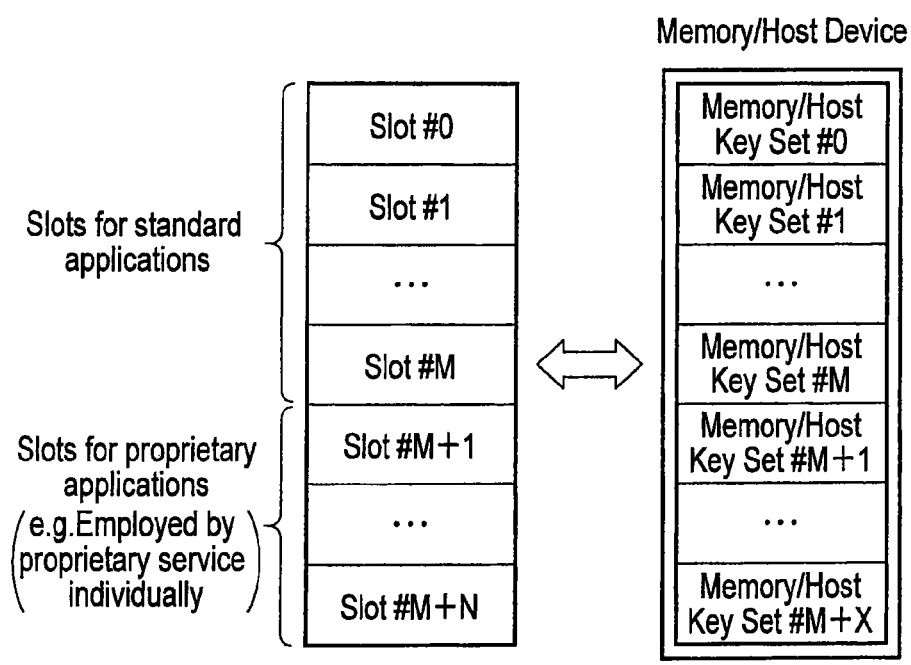
FIG. 7 is a view showing a rough classification method of slots and a key assignment method to a host application and memory according to the first embodiment.

Examples of a slot rough classification method and a key assignment method to the host application 800 and memory 100 will be described below with reference to FIG. 7. As in the case of FIG. 6, slots are assigned in association with applications.

In this case, assignment can be made by manufacturers of the host application 800 and secure flash memory 100 and based on a unique agreement between the manufacturers. On the other hand, an agreement can be made by a body (for example, a standards body) including stakeholders such as manufacturers and service providers. However, when applications of all slots are defined by the standards body, degrees of freedom of the agreement are impaired in an application used by a certain manufacturer alone or the like. In FIG. 7, slot numbers within a certain range (slots numbers 0 to M in FIG. 7) are set as a standard application area of applications defined by the standards body, and those within another range (slot numbers M+1 to M+N in FIG. 7) are set as a non-standard application area arbitrarily defined by each stakeholder. Thus, both broad compatibility in common applications and degrees of freedom in individual applications can be assured at the same time. To each slot, the aforementioned data and functions required for authentication are given. In this case, of the data required for authentication, those given/applied by the standards body, each manufacturer, or the like will be referred to as a key set hereinafter. A key set given/applied to the host application 800 will be referred to as a host key set hereinafter, and that given/applied to the memory 100 will be referred to as a memory key set hereinafter. Key sets, which are different for respective slots or are common to some slots, are given/applied.

Figure 8:
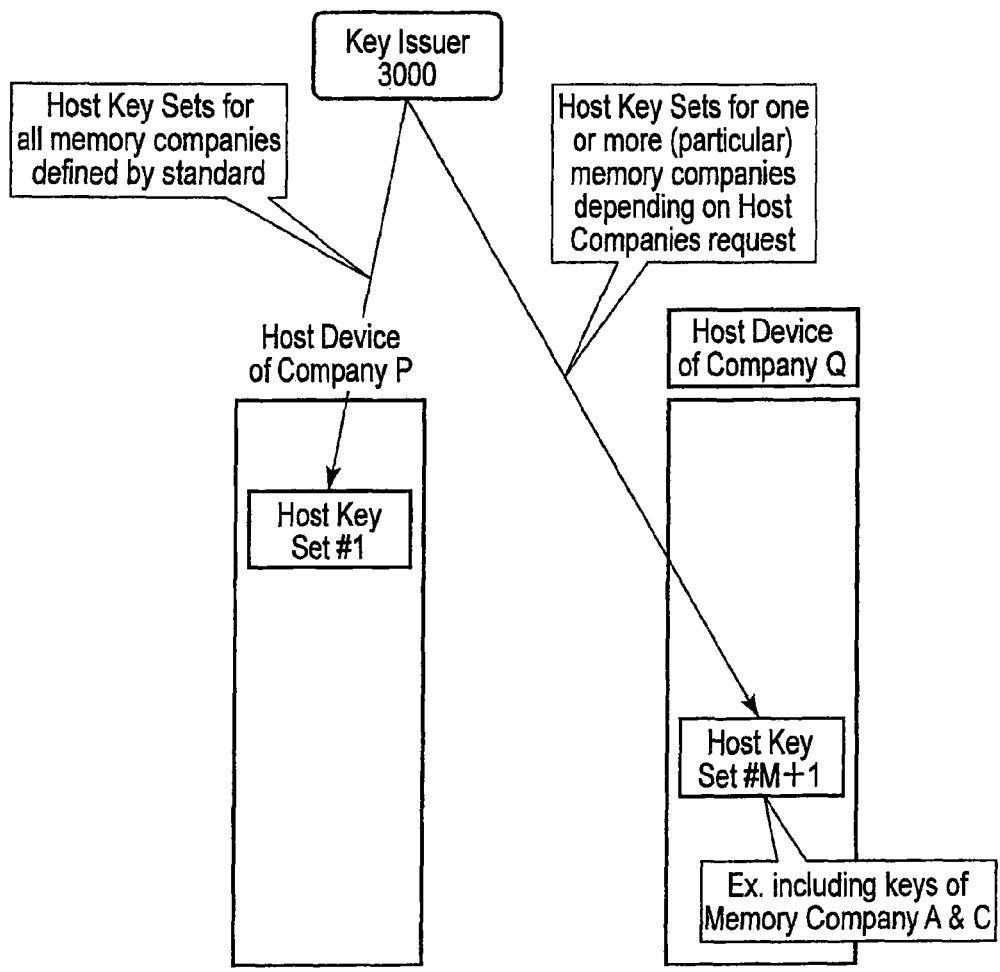
FIG. 8 is a view showing a method of distributing key sets after matching required to assure compatibility according to the first embodiment.

Next, a method of distributing key sets after matching of the key sets required to assure compatibility will be described below with reference to FIG. 8. In this example, respective key sets are distributed to respective manufacturers by a key issuance/management center 3000, and are applied to respective apparatuses. Host devices may be manufactured by a plurality of manufacturers (A and B), and may have different required authentication function ranges.

Since a host device has an attribute that the minimum guaranteed slots are defined on a memory device (secure flash memory) side and the host device is manufactured depending on each use application, specific slot numbers to be supported are entrusted to the respective manufacturers. In this case, when a host device which supports the minimum guaranteed slots or the slot number range of the standard application area is manufactured, host key sets which suffice to authenticate all memory devices are given/applied to the host device (in FIG. 8, a host device manufactured by manufacturer A).

On the other hand, in other ranges, in the case of an application which suffices to assure compatibility within a limited range by an agreement between a host device manufacturer and memory manufacturer, a host key set which suffices to authenticate a specific memory device is given/applied to a host device (in FIG. 8, a host device manufactured by manufacturer B) in place of those which suffice to authenticate all memory devices. More specifically, of pieces of secret information $HKey_{i,j}$ ($i=1, \ldots, m$; $j$ is a fixed value in the $HKey_{i,j}$) according to the aforementioned embodiment, $i$ corresponds to $NKey_i$ possessed by each memory device. That is, when a host application has only $HKey_{i,j}$ ($i=1$), this means that the host application has only a function of authenticating a memory device having $NKey_i$ ($i=1$). Also, when a host application has only $HKey_{i,j}$ ($i=3$), this means that the host application has only a function of authenticating a memory device having $NKey_i$ ($i=3$). That is, when a host application authenticates a specific memory device, secret information $HKey_{i,j}$ corresponding to $i$ of the target memory device is given/applied to that host application.

The arrangement and operation of the host device 10 according to the first embodiment will be described below with reference to FIGS. 9 and 10. The first embodiment will explain an example in which the host application 800 executes authentication processing of the secure flash memory 100 in the host device 10.

Figure 9:
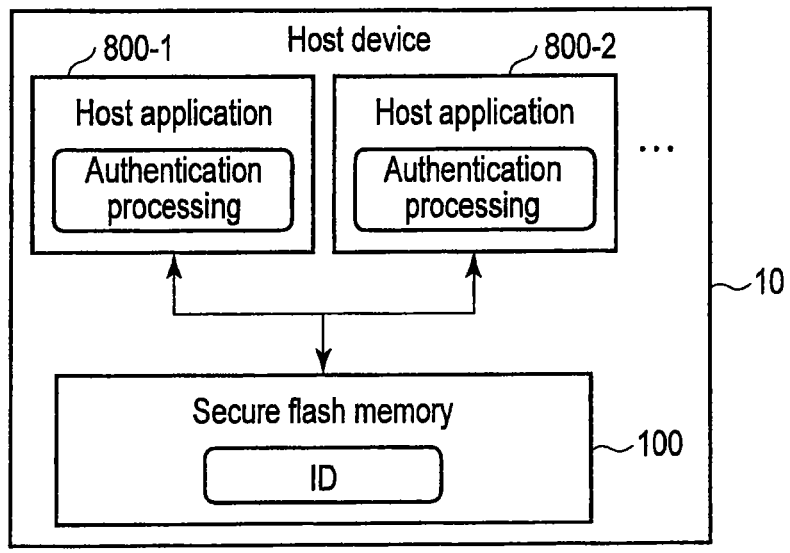
FIG. 9 is a block diagram showing the arrangement of the host device according to the first embodiment.

FIG. 9 is a block diagram showing the arrangement of the host device 10.

As shown in FIG. 9, the host device 10 includes the secure flash memory 100 and host applications 800-1 and 800-2. The secure flash memory 100 stores identification information ID, which is stored in advance. The identification information ID includes secret information NKey and secret identification information SecretID.

Figure 10:
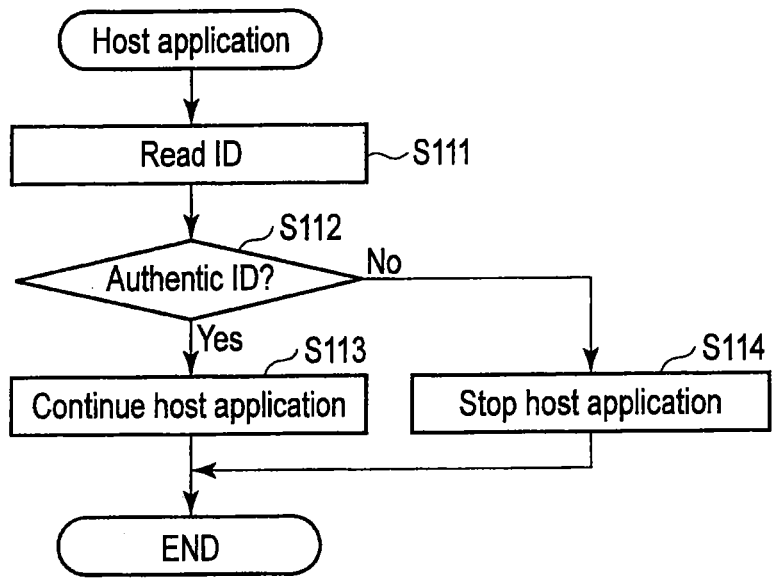
FIG. 10 is a flowchart showing processing of a host application in the host device according to the first embodiment.

FIG. 10 is a flowchart showing processing of the host application 800-1 including authentication processing in the host device 10. The authentication processing executed in FIG. 10 is the same as that shown in FIGS. 3 and 4.

The CPU 300 which executes the host application 800-1 reads out the identification information ID from the secure flash memory 100 (step S111). Then, the CPU 300 determines whether or not the identification information ID is authentic (step S112). If the identification information ID is authentic, the CPU 300 continues processing of the host application 800-1 (step S113). On the other hand, if the identification information ID is inauthentic, the CPU 300 stops processing of the host application 800-1 (step S114). After that, the CPU 300 ends the processing of the host application 800-1. The same processing as in the host application 800-1 applies to processing of the host application 800-2.

According to the first embodiment, since a host device, which does not incorporate a secure flash memory 100 having authentic identification information ID, cannot operate a host application, illicit use of secret information stored in the secure flash memory 100 can be prevented. For example, when the secure flash memory 100 is replaced by another NAND flash memory or the like, the host device (host application) cannot be operated. That is, an environment which cannot be operated by a host device that does not incorporate a secure flash memory 100 having authentic identification information ID can be provided.

Second Embodiment

The arrangement and operation of a host device according to the second embodiment will be described below. The second embodiment will explain an example in which an external server of a host device executes authentication processing of a secure flash memory 100 to write data, and authentication processing is executed in the host device to read out data.

Figure 11:
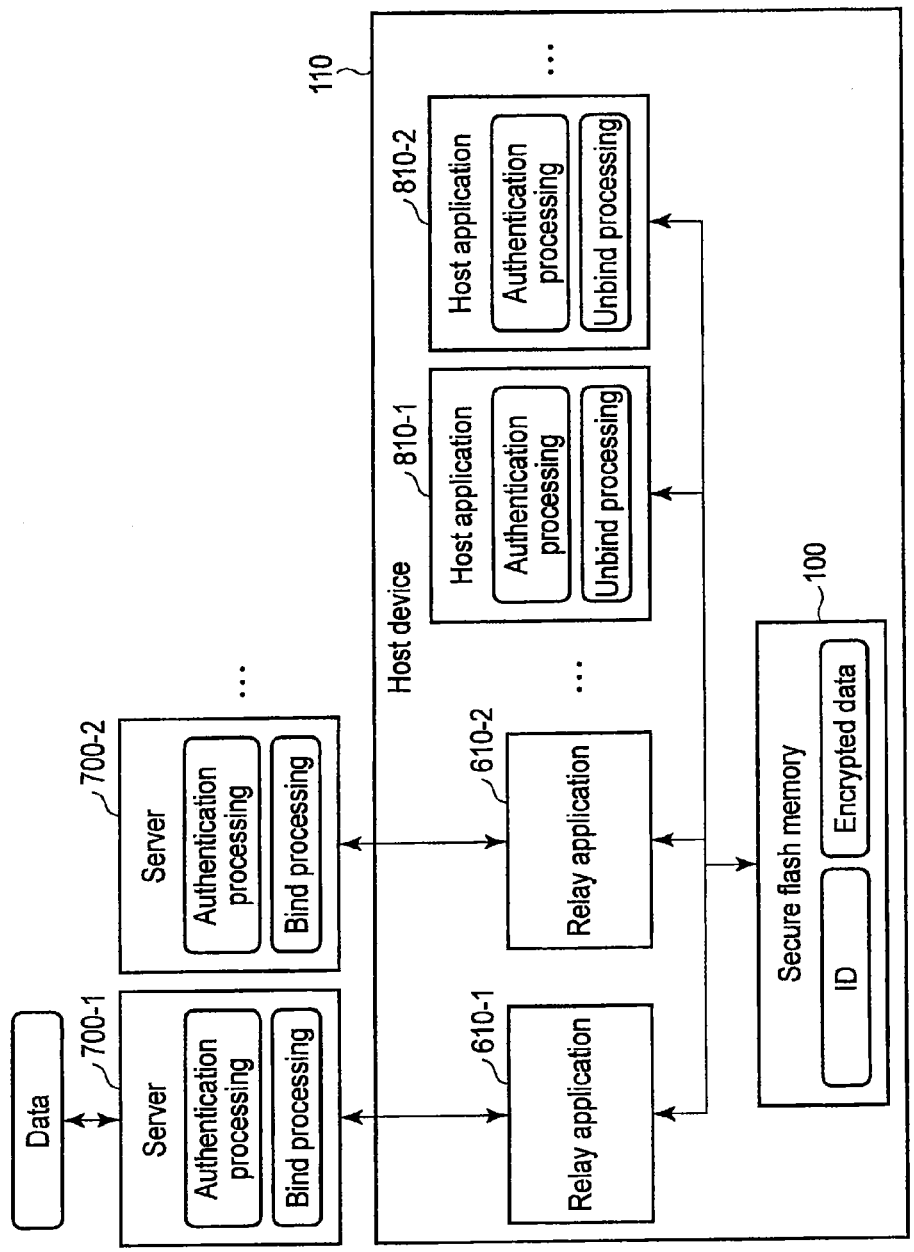
FIG. 11 is a block diagram showing the arrangement of a host device according to a second embodiment.

FIG. 11 is a block diagram showing the arrangement of the host device.

As shown in FIG. 11, a host device 110 includes a secure flash memory 100, host application 810-1, host application 810-2, relay application 610-1, and relay application 610-2. To the host device 110, servers 700-1 and 700-2 are connected. The relay application 610-1 relays exchange of signals between the server 700-1 and secure flash memory 100. Furthermore, the relay application 610-2 relays exchange of signals between the server 700-2 and secure flash memory 100.

The operation of the host device 110 of the second embodiment is as follows.

Operations executed when the server 700-1 executes authentication processing of the secure flash memory 100 to store data in the memory 100 will be described first.

The server 700-1 executes the authentication processing of the secure flash memory 100 with the secure flash memory 100 included in the host device 110. At this time, the authentication processing is executed via the relay application 610-1 in the host device 110. If the authentication processing has succeeded, the server 700-1 applies bind processing to data to be downloaded to the secure flash memory 100. The data which has undergone the bind processing is downloaded intact to the host device 110 as encrypted data, and is stored in the secure flash memory 100. The bind processing of the data will be described later.

Figure 12:
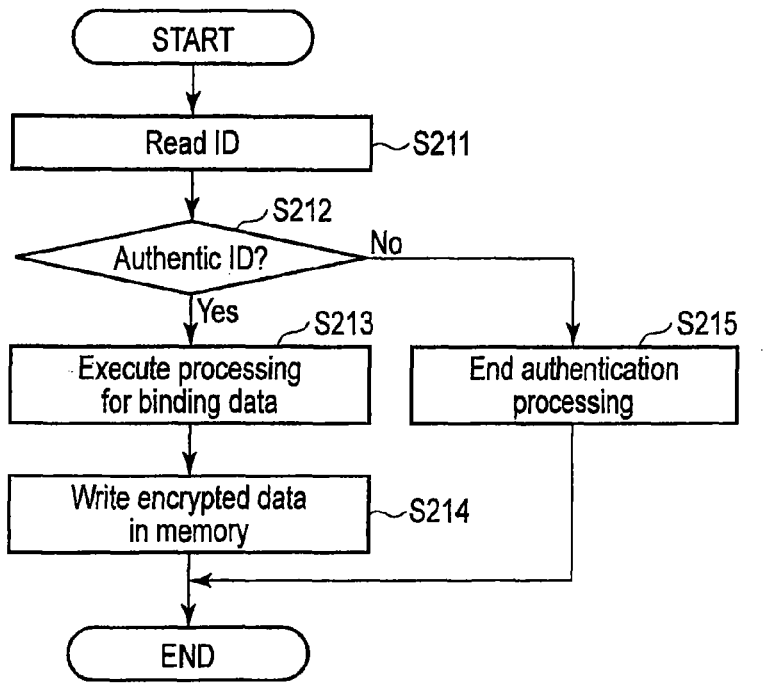
FIG. 12 is a flowchart showing authentication processing and bind processing by a server according to the second embodiment.

The aforementioned authentication processing and bind processing by the server 700-1 will be described below with reference to FIG. 12. FIG. 12 is a flowchart showing the authentication processing and bind processing by the server 700-1. The authentication processing executed in FIG. 12 is the same as that shown in FIGS. 3 and 4 if the CPU is replaced by the server in FIGS. 3 and 4.

The server 700-1 reads out identification information ID from the secure flash memory 100 (step S211). Then, the server 700-1 determines whether or not the identification information ID is authentic (step S212). If the identification information ID is authentic, the server 700-1 executes processing for binding data (step S213). Then, the bound encrypted data is written in the secure flash memory 100 via the relay application 610-1 (step S214).

On the other hand, if the identification information ID is inauthentic, the server 700-1 ends the authentication processing (step S215). The same processing as in the server 700-1 applies to the operation of the server 700-2.

Figure 13:
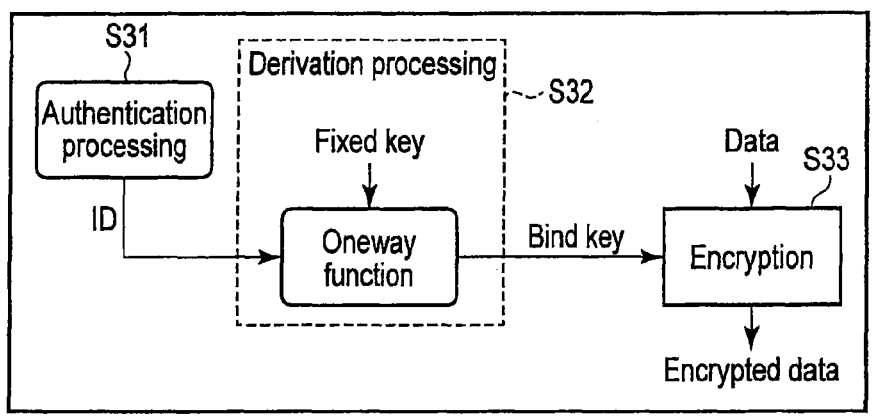
FIG. 13 is a view showing a practical example of the bind processing according to the second embodiment.

The data bind processing executed by the server 700-1 will be described below with reference to FIG. 13. FIG. 13 shows a practical example of the bind processing.

After completion of the authentication processing (step S31), the server 700-1 applies derivation processing to the acquired identification information ID (step S32) to generate a bind key. Then, the server 700-1 encrypts data using the bind key (step S33) to generate encrypted data. In the derivation processing (step S32), the identification information ID is converted by a oneway function using a fixed key to generate the bind key.

Operations executed when a CPU 300 which executes the host applicator 810-1 executes authentication processing of the secure flash memory 100 to read out data from the memory 100 will be described below.

The CPU 300 which executes the host application 810-1 executes authentication processing of the secure flash memory 100 with the secure flash memory 100 included in the host device 110. If the authentication processing has succeeded, the CPU 300 reads out encrypted data from the secure flash memory 100, and executes processing for unbinding the encrypted data. The encrypted data is decrypted by the unbind processing, and is used. The processing for unbinding the encrypted data will be described later.

The aforementioned authentication processing and unbind processing by the CPU 300 will be described in detail below with reference to FIG. 14. FIG. 14 is a flowchart showing the authentication processing and unbind processing by the CPU 300. The authentication processing executed in FIG. 14 is the same as that shown in FIGS. 3 and 4 if the host application 800 is replaced by the host application 810 in FIGS. 3 and 4.

The CPU 300 which executes the host application 810-1, reads out identification information ID from the secure flash memory 100 (step S311). Then, the CPU 300 determines whether or not the identification information ID is authentic (step S312). If the identification ID is authentic, the CPU 300 reads out encrypted data from the secure flash memory 100, and executes the processing for unbinding the encrypted data (step S313). Then, the data decrypted by the unbind processing is used by the CPU 300 (step S314).

On the other hand, if the identification information ID is inauthentic, the CPU 300 ends the authentication processing (step S315). Note that the server 700-2 reads out information via the relay application 610-2, and other operations are the same as those of the CPU 300.

The unbind processing executed by the CPU 300 will be described below with reference to FIG. 15. FIG. 15 shows a practical example of the unbind processing.

After completion of the authentication processing (step S31), the CPU 300 applies derivation processing to the acquired identification information ID (step S32) to generate a bind key. Then, the CPU 300 decrypts the encrypted data using the bind key (step S34) to restore data before encryption. In the derivation processing (step S32), the identification information ID is converted by a oneway function using a fixed key to generate the bind key.

According to the second embodiment, since a host device which does not incorporate a secure flash memory 100 having authentic identification information ID cannot download data from the server to the host device, downloading of data to the illicit host device can be prevented. Also, since a CPU of a host device, which does not incorporate a secure flash memory 100 having authentic identification information ID, cannot use data stored in the secure flash memory 100, illicit use of data stored in the secure flash memory 100 can be prevented. For example, when the secure flash memory 100 is replaced by another NAND flash memory or the like, data cannot be downloaded to the host device, and data stored in the NAND flash memory cannot be used. That is, an environment which cannot be operated by a host device, and which does not incorporate a secure flash memory 100 having authentic identification information ID, can be provided.

Third Embodiment

The arrangement and operation of a host device according to the third embodiment will be described below. The third embodiment will explain an example which is different from the second embodiment and in which an external server of a host device executes authentication processing of a secure flash memory 100 to write data, and authentication processing is executed in the host device to read out data.

Figure 16:
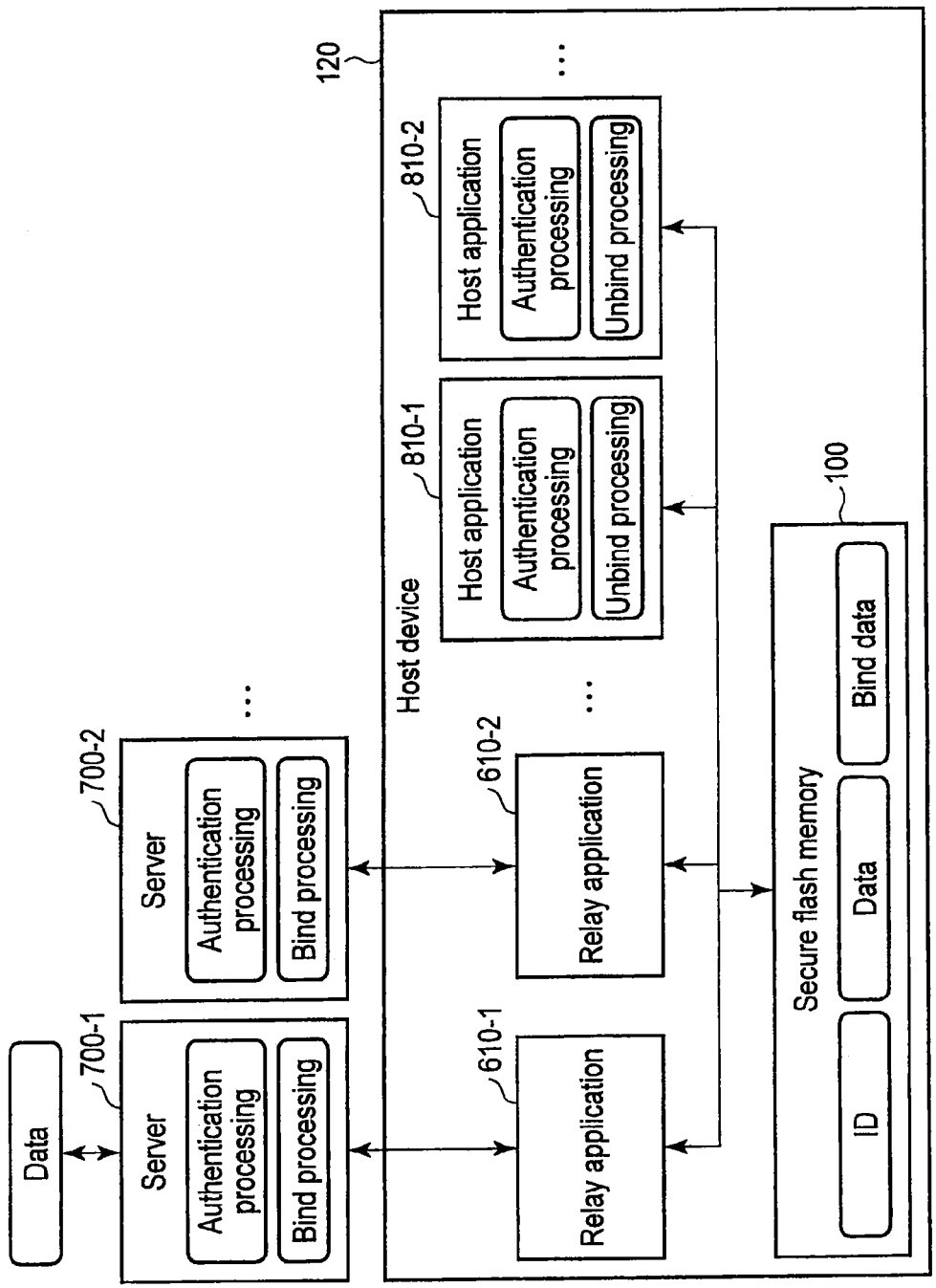
FIG. 16 is a block diagram showing the arrangement of a host device according to a third embodiment.

FIG. 16 is a block diagram showing the arrangement of the host device.

As shown in FIG. 16, a host device 120 includes a secure flash memory 100, host application 810-1, host application 810-2, relay application 610-1, and relay application 610-2. To the host device 110, servers 700-1 and 700-2 are connected. The relay application 610-1 relays exchange of signals between the server 700-1 and secure flash memory 100. Furthermore, the relay application 610-2 relays exchange of signals between the server 700-2 and secure flash memory 100.

The operation of the host device 120 of the third embodiment is as follows.

Operations executed when the server 700-1 executes authentication processing of the secure flash memory 100 to store data in the memory 100 will be described first.

The server 700-1 executes the authentication processing of the secure flash memory 100 with the secure flash memory 100 included in the host device 120. In this case, the authentication processing is executed via the relay application 610-1 in the host device 120. If the authentication processing has succeeded, the server 700-1 applies bind processing to data to be downloaded to the secure flash memory 100 to generate bind data. The bind data and data before the bind processing are downloaded to the host device 120, and are stored in the secure flash memory 100. The bind processing for generating the bind data will be described later.

The aforementioned authentication processing and bind processing by the server 700-1 will be described below with reference to FIG. 17. FIG. 17 is a flowchart showing the authentication processing and bind processing by the server 700-1. The authentication processing executed in FIG. 17 is the same as that shown in FIGS. 3 and 4 if the CPU is replaced by the server in FIGS. 3 and 4.

The server 700-1 reads out identification information ID from the secure flash memory 100 (step S411). Then, the server 700-1 determines whether or not the identification information ID is authentic (step S412). If the identification information ID is authentic, the server 700-1 executes processing for binding data to generate bind data (step S413). Then, the bind data and data before the bind processing are written in the secure flash memory 100 via the relay application 610-1 (step S414).

On the other hand, if the identification information ID is inauthentic, the server 700-1 ends the authentication processing (step S415). The operation of the server 700-2 is the same as that of the server 700-1.

Figure 18:
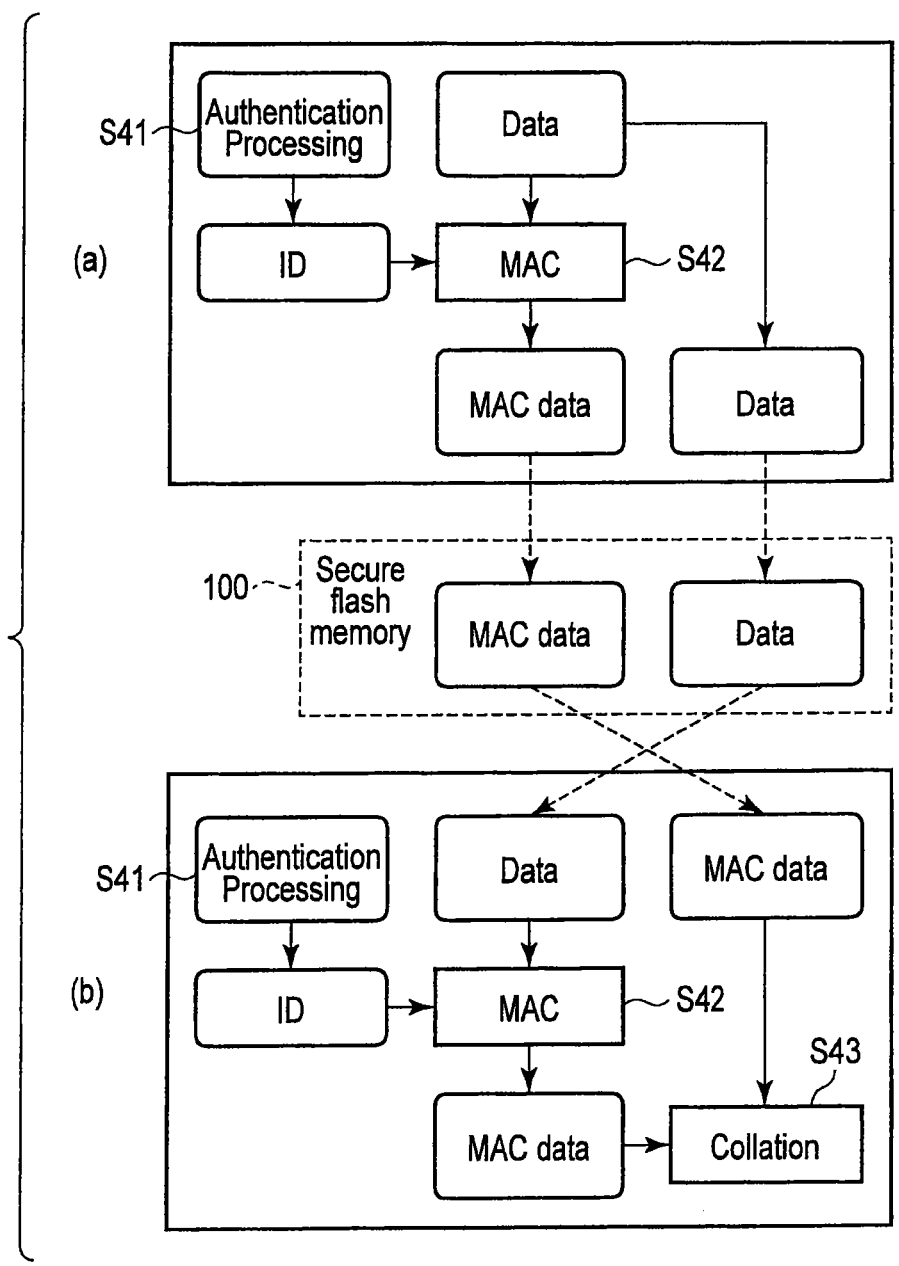
FIG. 18 is a view showing a practical example of the bind processing and unbind processing according to the third embodiment.

The data bind processing executed by the server 700-1 will be described below with reference to FIG. 18(*a*). FIG. 18(*a*) shows a practical example of the bind processing.

After completion of the authentication processing (step S41), the server 700-1 generates bind data from data based on the acquired identification information ID. In this case, for example, the server 700-1 generates a message authentication code (MAC) using the identification information ID and data (step S42). Then, the server 700-1 appends the MAC to the data to generate MAC data.

Operations executed when a CPU 300 which executes the host application 810-1 executes authentication processing of the secure flash memory 100 to read out data from the memory 100 will be described below.

The CPU 300 which executes the host application 810-1 executes authentication processing of the secure flash memory 100 with the secure flash memory 100 included in the host device 120. If the authentication processing has succeeded, the CPU 300 reads out data from the secure flash memory 100, and applies bind processing to the readout data to generate bind data. Also, the CPU 300 reads out bind data from the secure flash memory 100. The CPU 300 compares and collates the readout bind data and generated bind data. If the two pieces of bind data are the same, the CPU 300 uses the readout data.

Figure 19:
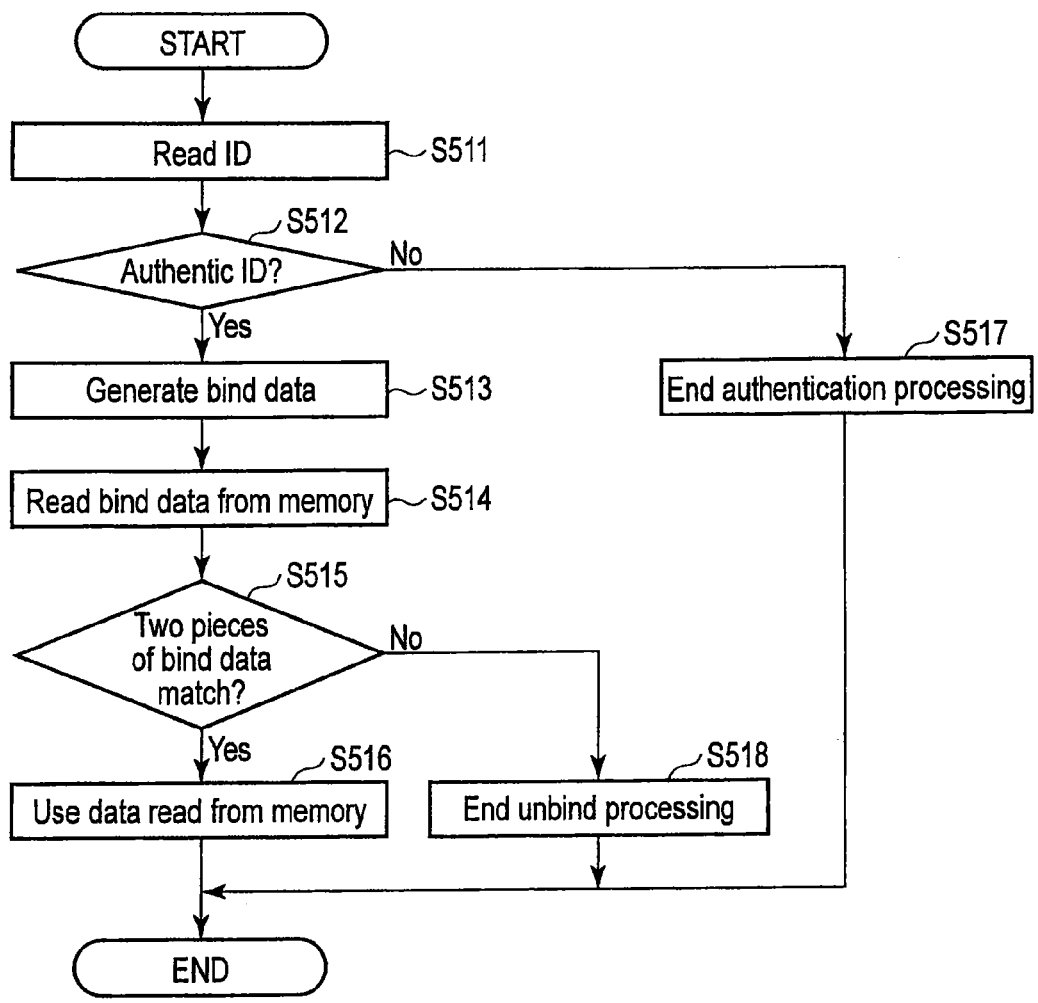
FIG. 19 is a flowchart showing authentication processing and unbind processing by a CPU according to the third embodiment.

The aforementioned authentication processing and unbind processing (bind processing and collation processing) by the CPU 300 will be described in detail below with reference to FIG. 19. FIG. 19 is a flowchart showing the authentication processing and unbind processing (bind processing and collation processing) by the CPU 300. The authentication processing executed in FIG. 19 is the same as that shown in FIGS. 3 and 4 if the host application 800 is replaced by the host application 810 in FIGS. 3 and 4.

The CPU 300 which executes the host application 810-1 reads out identification information ID from the secure flash memory 100 (step S511). Then, the CPU 300 determines whether or not the identification information ID is authentic (step S512).

If the identification ID is authentic, the CPU 300 reads out data from the secure flash memory 100, and applies the bind processing to the readout data to generate bind data (step S513). Also, the CPU 300 reads out bind data from the secure flash memory 100 (step S514). Then, the CPU 300 compares and collates the readout bind data and generated bind data to determine whether or not the two pieces of bind data match (step S515). If the two pieces of bind data match, the CPU 300 uses the data read out from the secure flash memory 100 (step S516).

On the other hand, if the identification information ID is inauthentic in step S512, the CPU 300 ends the authentication processing (step S517). If the two pieces of bind data do not match in step S515, the CPU 300 ends the unbind processing (step S518). Note that the server 700-2 reads out information via the relay application 610-2, and other operations are the same as those of the CPU 300.

The unbind processing (bind processing and collation processing) executed by the CPU 300 will be described below with reference to FIG. 18(b). FIG. 18(b) shows a practical example of the unbind processing.

After completion of the authentication processing (step S41), the CPU 300 generates bind data from data read out from the secure flash memory 100, based on the acquired identification information ID. In this case, for example, the CPU 300 generates a message authentication code (MAC) using the identification information ID and data read out from the secure flash memory 100 (step S42). Then, the CPU 300 appends the MAC to the data to generate MAC data. After that, as describe above, the CPU 300 collates the generated MAC data with MAC data read out from the secure flash memory 100 (step S43).

According to the third embodiment, since a host device which does not incorporate a secure flash memory 100 having authentic identification information ID cannot download data from the server to the host device, downloading of data to the illicit host device can be prevented. Also, since a CPU of a host device which does not incorporate a secure flash memory 100 having authentic identification information ID cannot use data stored in the secure flash memory 100, illicit use of data stored in the secure flash memory 100 can be prevented. For example, when the secure flash memory 100 is replaced by another NAND flash memory or the like, data cannot be downloaded to the host device, and data stored in the NAND flash memory cannot be used. That is, an environment which cannot be operated by a host device, which does not incorporate a secure flash memory 100 having authentic identification information ID, can be provided.

As described above, according to the embodiments, an information processing apparatus which can prevent illicit use of secret information can be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a nonvolatile semiconductor memory configured to store identification information; and
a processor configured to control an application which executes authentication processing for authenticating validation of the identification information stored in the nonvolatile semiconductor memory,
wherein the processor executes the application to read the identification information from the nonvolatile semiconductor memory, and to execute the authentication processing for determining whether or not the identification information is authentic,
when the identification information is authentic, the processor continues at least some read and write functions of the application, and when the identification information is inauthentic, the processor ends some read and write functions of the application,
wherein the nonvolatile semiconductor memory and the application include a plurality of slots, each of the slots has a function and an identification information corresponding to a use mode of the application, and
wherein the processor further executes the authentication processing for determining whether or not the identification information of a slot is authentic.

2. The apparatus according to claim 1, wherein the nonvolatile semiconductor memory includes a NAND flash memory.

3. An information processing apparatus comprising:
a nonvolatile semiconductor memory configured to store identification information; and
a processor configured to control an application which executes authentication processing for authenticating validation of the identification information stored in the nonvolatile semiconductor memory,
wherein the nonvolatile semiconductor memory and the application include a plurality of slots, each of the plurality of slots has an associated function and an identification information corresponding to a use mode of the application,
the processor executes the application to read the identification information of a slot from the nonvolatile semiconductor memory, and to execute the authentication processing for determining whether or not the identification information of the slot is authentic,
when the identification information of the slot is authentic, the processor generates a bind key derived from the identification information, encrypts data using the bind key, and stores the encrypted data in the nonvolatile semiconductor memory, and
when the identification information of the slot is inauthentic, the processor ends the authentication processing.

4. The apparatus according to claim 3, wherein the processor executes the application to read the identification information of the slot from the nonvolatile semiconductor memory, and to execute the authentication processing for determining whether or not the identification information of the slot is authentic,
when the identification information of the slot is authentic, the processor generates a bind key derived from the identification information of the slot, and decrypts the encrypted data read out from the nonvolatile semiconductor memory, using the bind key, and when the identification information of the slot is inauthentic, the processor ends the authentication processing.

5. The apparatus according to claim 3, wherein the nonvolatile semiconductor memory includes a NAND flash memory.

6. An information processing apparatus comprising:
a nonvolatile semiconductor memory configured to store identification information; and
a processor configured to control an application which executes authentication processing for authenticating validity of the identification information stored in the nonvolatile semiconductor memory,
wherein the nonvolatile semiconductor memory and the application includes a plurality of slots, each of slots has a function and an identification information corresponding to a use mode of the application,
the processor executes the application to read the identification information of a slot from the nonvolatile semiconductor memory, and to execute the authentication processing for determining whether or not the identification information of the slot is authentic,
when the identification information of the slot is authentic, the processor generates first bind data from first data based on the identification information of the slot, and stores the first data and the first bind data in the nonvolatile semiconductor memory, and
when the identification information of the slot is inauthentic, the processor ends the authentication processing.

7. The apparatus according to claim 6, wherein the processor executes the application to read out the identification information of the slot from the nonvolatile semiconductor memory, and to execute the authentication processing for determining whether or not the identification information of the slot is authentic,
when the identification information of the slot is authentic, the processor reads the first data from the nonvolatile semiconductor memory, generates second bind data from the first data based on the identification information of the slot, collates the first bind data with the second bind data, and uses the first data when the first bind data and the second bind data match, and
when the identification information of the slot is inauthentic, the processor ends the authentication processing.

8. The apparatus according to claim 6, wherein the nonvolatile semiconductor memory includes a NAND flash memory.

9. The apparatus according to claim 1, wherein
when the identification information of a slot is authentic, the processor executes the function corresponding to the use mode of the application, and when the identification information of the slot is inauthentic, the processor disables the function corresponding to the use mode of the application.

* * * * *